(12) United States Patent
Rondeau et al.

(10) Patent No.: US 7,180,662 B2
(45) Date of Patent: Feb. 20, 2007

(54) STAGE ASSEMBLY AND METHOD FOR OPTICAL MICROSCOPE INCLUDING Z-AXIS STAGE AND PIEZOELECTRIC ACTUATOR FOR RECTILINEAR TRANSLATION OF Z STAGE

(75) Inventors: Gary D. Rondeau, Eugene, OR (US); John H. Zemek, Springfield, OR (US)

(73) Assignee: Applied Scientific Instrumentation Inc., Eugene, OR (US)

( * ) Notice: Subject to any disclaimer, the term of this patent is extended or adjusted under 35 U.S.C. 154(b) by 0 days.

(21) Appl. No.: 10/823,349

(22) Filed: Apr. 12, 2004

(65) Prior Publication Data

US 2005/0225852 A1  Oct. 13, 2005

(51) Int. Cl.
    *G02B 21/26* (2006.01)
(52) U.S. Cl. ...................... 359/393; 359/392
(58) Field of Classification Search ............... 359/368, 359/383–395
    See application file for complete search history.

(56) References Cited

U.S. PATENT DOCUMENTS

| | | | | |
|---|---|---|---|---|
| 3,720,849 | A | 3/1973 | Bardocz | 310/328 |
| 4,012,112 | A | 3/1977 | Masterson | 359/393 |
| 4,029,949 | A | 6/1977 | Dew | 700/60 |
| 4,299,440 | A * | 11/1981 | Hodgson | 359/393 |
| 4,520,570 | A | 6/1985 | Bednorz et al. | 33/613 |
| 4,540,240 | A | 9/1985 | Kadi | 359/824 |
| 4,688,908 | A | 8/1987 | Moore | 359/393 |
| 4,814,682 | A | 3/1989 | Yamada | 318/640 |
| 4,948,330 | A * | 8/1990 | Nomura et al. | 414/754 |
| 4,987,303 | A | 1/1991 | Takase et al. | 250/306 |
| 5,216,235 | A | 6/1993 | Lin | 250/201.6 |
| 5,252,884 | A | 10/1993 | Dona | 310/328 |
| 5,260,622 | A | 11/1993 | West | 310/328 |
| 5,280,677 | A | 1/1994 | Kubo et al. | 33/568 |
| 5,306,919 | A | 4/1994 | Elings et al. | 250/442.11 |
| 5,323,712 | A * | 6/1994 | Kikuiri | 108/20 |
| 5,438,451 | A | 8/1995 | Schweizer | 359/393 |
| 5,638,206 | A | 6/1997 | Sumiya et al. | 359/368 |
| 5,672,816 | A | 9/1997 | Park et al. | 73/105 |
| 5,684,628 | A * | 11/1997 | Gerhard | 359/391 |
| 5,705,878 | A | 1/1998 | Lewis et al. | 310/328 |
| 5,812,310 | A * | 9/1998 | Stewart et al. | 359/392 |
| 5,963,367 | A | 10/1999 | Aksyuk et al. | 359/392 |
| 5,991,005 | A * | 11/1999 | Horikawa et al. | 355/53 |
| 6,040,653 | A | 3/2000 | O'Neill | 310/328 |
| 6,137,627 | A | 10/2000 | Engelhardt et al. | 359/393 |

(Continued)

FOREIGN PATENT DOCUMENTS

DE          349 911 A2 *  6/1989   .................. 359/393

(Continued)

*Primary Examiner*—Thong Q. Nguyen
(74) *Attorney, Agent, or Firm*—Kolisch Hartwell, P.C.

(57) ABSTRACT

A stage assembly mountable on an optical microscope for orienting a sample into a desired focal position includes an X-axis plate operable for rectilinear shifting in the X-axis direction and a Y-axis plate mounted on the X-axis plate operable for rectilinear translation in the Y-axis direction. A Z-axis plate is mounted on the XY plate assembly for carrying a sample to be investigated and a piezoelectric actuator mechanism is interposed between the XY plate assembly and the Z-axis plate operable for rectilinear translation of the Z-axis plate.

16 Claims, 4 Drawing Sheets

U.S. PATENT DOCUMENTS

| | | |
|---|---|---|
| 6,229,607 B1 * | 5/2001 | Shirai et al. ................. 356/614 |
| 6,252,705 B1 | 6/2001 | Lo et al. ...................... 359/393 |
| 6,257,053 B1 | 7/2001 | Tomita et al. ................. 73/105 |
| 6,310,342 B1 | 10/2001 | Braunstein et al. ......... 250/306 |
| 6,335,824 B1 | 1/2002 | Overbeck ................... 359/368 |
| 6,359,370 B1 | 3/2002 | Chang ........................ 310/328 |
| 6,459,088 B1 | 10/2002 | Yasuda et al. ......... 250/442.11 |
| 6,501,210 B1 | 12/2002 | Ueno .......................... 310/331 |
| 6,555,829 B1 | 4/2003 | Spallas et al. ........... 250/492.2 |
| 6,617,761 B2 | 9/2003 | Ando et al. .................. 310/328 |
| 6,781,753 B2 * | 8/2004 | Gunderson .................. 359/393 |

FOREIGN PATENT DOCUMENTS

| | | | |
|---|---|---|---|
| JP | 5-323203 | * 12/1993 | ................. 359/392 |

* cited by examiner

STAGE ASSEMBLY AND METHOD FOR OPTICAL MICROSCOPE INCLUDING Z-AXIS STAGE AND PIEZOELECTRIC ACTUATOR FOR RECTILINEAR TRANSLATION OF Z STAGE

BACKGROUND

The present invention relates to the field of optical microscopes, and more particularly is directed to a novel stage assembly which enables fine positioning of a specimen or sample to be investigated. Conventionally, stage assemblies include mechanisms for positioning specimens or samples along the X and Y-axis, in a conventional coordinate system, and employ other mechanisms for shifting the objective lens of an optical microscope to provide focusing in the Z-axis direction.

SUMMARY

The present disclosure describes stage assemblies and methods of using an optical microscope. The stage assembly is mountable on an optical microscope for orienting a sample into a desired focal position and includes an X-axis plate operable for rectilinear shifting in the X-axis direction and a Y-axis plate mounted on the X-axis plate operable for rectilinear translation in the Y-axis direction. A Z-axis plate is mounted on the XY plate assembly for carrying a sample to be investigated and a piezoelectric actuator mechanism is interposed between the XY plate assembly and the Z-axis plate operable for rectilinear translation of the Z-axis plate.

BRIEF DESCRIPTION OF THE DRAWINGS

The accompanying drawings which are incorporated in and constitute a part of the specification, illustrate the preferred embodiment of the present invention, and together with the general description given above and the detailed description of the preferred embodiment given below, serve to explain the principals of the invention.

DETAILED DESCRIPTION OF THE PREFERRED EMBODIMENT

The present invention is directed to a stage assembly which includes X and Y-axis stage plates upon which is mounted an intermediate stage plate, namely, a Z-axis stage plate for rectilinear translation or shifting in the Z-axis direction. The Z-axis stage plate (or "Z-axis plate") is configured for holding a stage insert which in turn will support a microscope slide or other holder, such as a petri dish, multi-well plates, etc. for carrying the sample or specimen to be investigated.

A piezoelectric actuator mechanism is interposed between the XY plate assembly and the Z-axis plate for providing the rectilinear shifting of the Z-axis plate. This construction is provided for high performance systems in which the motion or translation of the Z-axis plate is preferably controlled precisely for movements of less than 0.05 micrometers.

Figure 1:
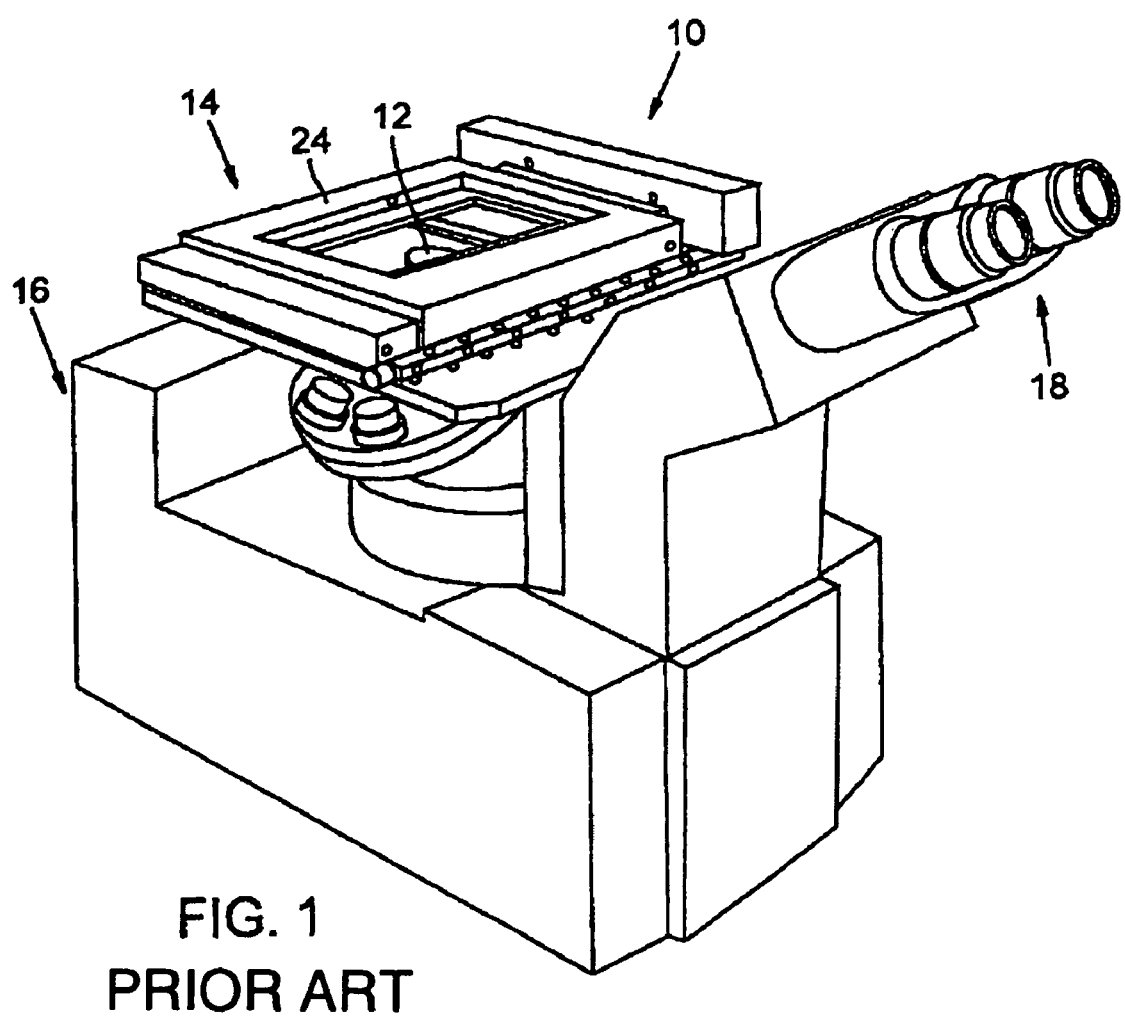
FIG. 1 is a perspective view of an optical microscope, of conventional construction, showing the XY-axis stage prior to insertion of the Z-axis stage.
Figure 2:
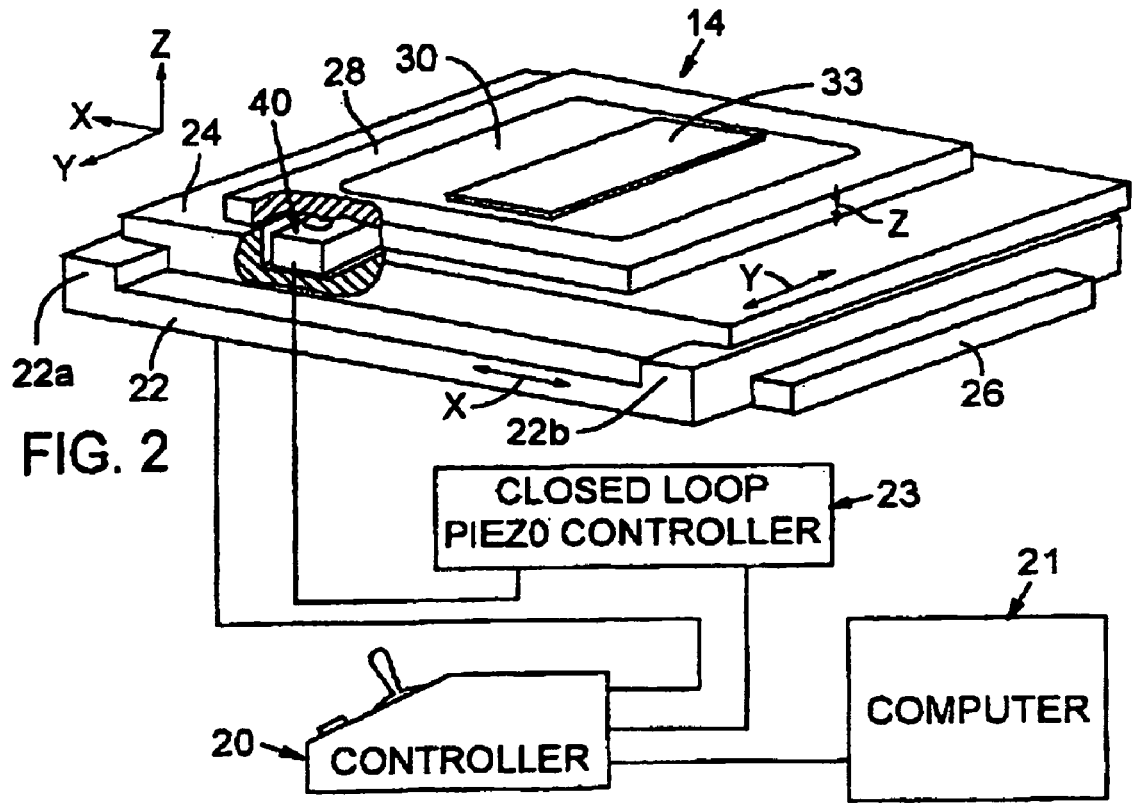
FIG. 2 is a diagrammatic view, shown in perspective, of the stage assembly of the present invention showing the Z-axis stage mounted in position on the XY stage, with a portion of the XY and Z stages cut-away to illustrate positioning of one of the piezoelectric actuators.

The overall system of a conventional optical microscope is generally indicated at 10 in FIG. 1, and in the orientation depicted, an objective lens is indicated at 12, positioned beneath an XY stage assembly, generally indicated at 14. (The light source for illumination of a specimen is not shown.) The microscope stand is generally indicated at 16, and eyepieces at 18, and the XY stage illustrated at 14 does not show the Z-axis plate yet mounted in position, nor insertion of a stage slide insert. The arrangement of these details will be more apparent from a consideration of FIGS. 2 and 3, and the description which follows. As shown in FIG. 2, stage assembly 14 of the present invention includes an X-axis plate operable for rectilinear shifting or translation along the X-axis and a Y-axis plate 24 mounted thereon operable for rectilinear translation along the Y-axis. The X-axis plate is open throughout its middle area (not shown) and slides along a guide 26; similarly, Y-axis plate 24 is also hollow in its central area, and is configured to translate in the Y direction along supporting rails or guideways 22a, 22b.

The X-Y-Z coordinate system is for reference purposes, and the convention of the X and Y directions could be reversed. The point is that the X and Y-axis plates move 15 orthogonally or at right angles to one another. The Z-axis plate moves in a direction perpendicular to the X-Y axis directions, as shown.

A Z-axis plate is shown at 28, and is dimensioned for insertion and retention within Y-axis plate 24 as will be described with reference to FIG. 4. As also shown in FIG. 2, a stage insert indicated at 30 is dimensioned for being received within Z-axis plate 28, for mounting a slide (or other sample holder) 33 which will contain the sample for investigation. Only a single piezoelectric actuator is shown in FIG. 2 at 40, but there will be a total of three as will be described. The piezoelectric actuators provide a mechanism for engaging a bottom of the Z-axis plate, and rectilinearly translating that plate in the Z-axis direction. Shown diagrammatically are a controller at 20, a computer at 21, and a closed loop piezo controller at 23, with electrical connections shown to the X plate and the piezoelectric mechanism. The connections are not shown in detail because such are conventional.

Figure 3:
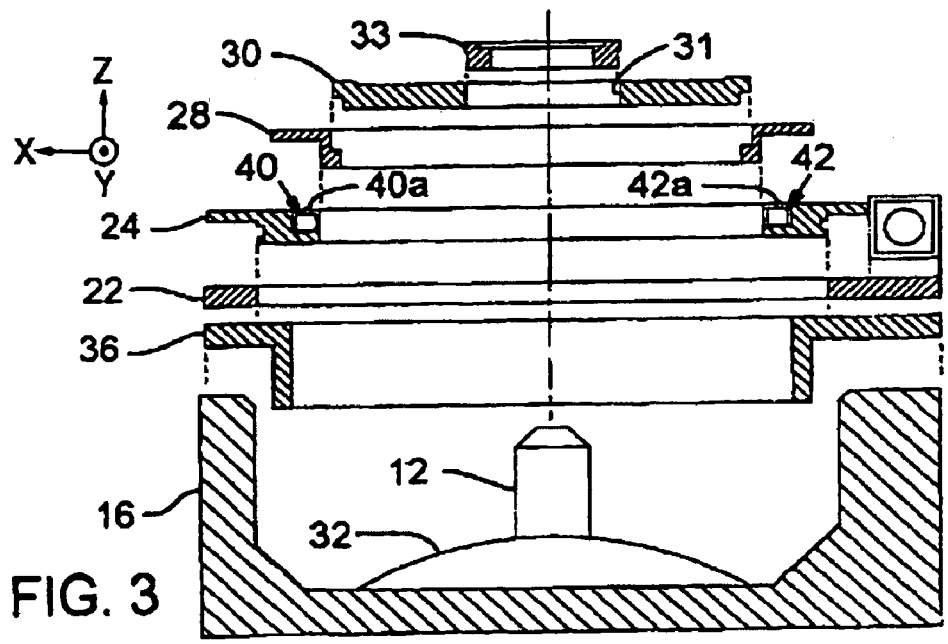
FIG. 3 is a cross-section schematic view, showing the XY and Z stage components separated from one another and a stationary bottom plate which in turn is mounted on the microscope stand, positioned above an objective lens.

In FIG. 3, there is shown an end view, of the components just described, illustrated in an exploded view to show their positioning relative to an optical microscope's objective lens. The optical microscope's stand or base, indicated at 16, supports a turret 32 and the microscope's objective (only one being shown) is indicated at 12. A stationary bottom plate indicated at 36 is mountable on the base, and is dimensioned for receiving X-axis plate 22, and Y-axis plate 24 is shown with piezoelectric actuators indicated at 40 and 42. As will be described, there are three piezoelectric actuators, and they are connected to engage the underside of flanged portions extending along the length of Z-axis plate 28. The stage insert is shown at 30, including its recess 31 for receiving therewithin a slide 33, for example. As mentioned previously, for optical microscopes in which the objective lens is located below the slide 33, each of the components, such as bottom plate 36, X-axis plate 22, Y-axis plate 24, Z-axis plate 28 and stage insert 30 are open in their internal regions; these internal openings allow for the passage of transmitted light and viewing of the sample carried on the slide or other holder 33 by the below-mounted objective lens.

The Piezoelectric Actuator Mechanism

Figure 4:
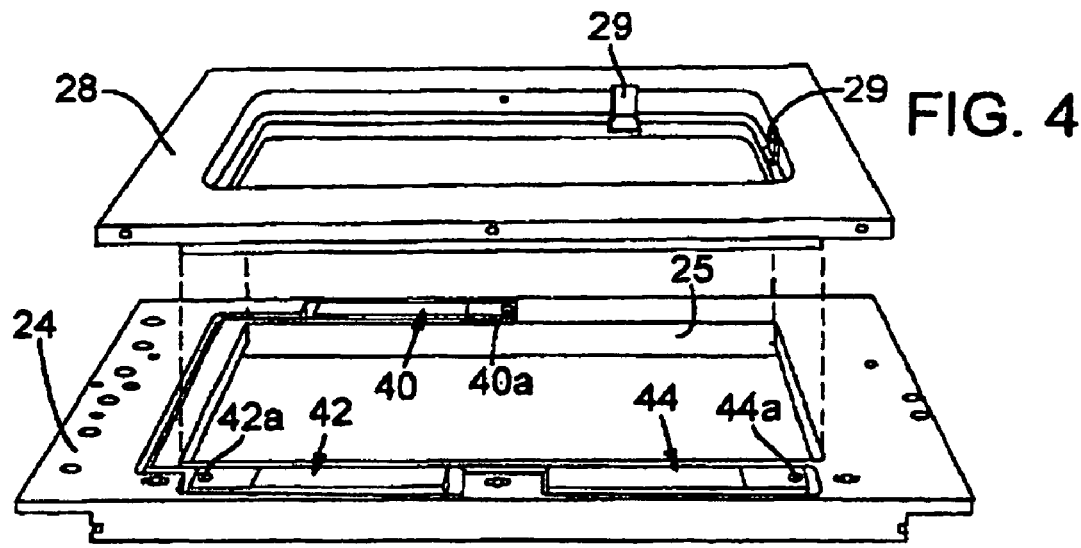
FIG. 4 is a view, shown in perspective, of the Y-axis and Z-axis stage plates separated from one another, illustrating positioning of the three piezoelectric actuators, prior to the Z-axis stage plate being inserted into the Y-axis stage plate.

FIG. 4 is a perspective view of Z-axis plate 28 spaced above the Y-axis plate, prior to assembly, and it can be seen that each of the plates includes an internal opening. For example, Y-axis plate 24 is formed with an opening 25 which is dimensioned to receive depending ledges of Z-axis plate 28, so that the Z-axis plate may be mounted or nested within the Y-axis plate and thereby carried by the XY plate assembly. As shown in FIG. 4, a piezoelectric actuator mechanism interposed between the XY plate assembly and the Z-axis plate includes three piezoelectric actuators indicated generally at 40, 42 and 44. The piezoelectric actuators are shown in more detail in the view of FIG. 5, which isolates Y-axis plate 24 directly from above. It will be seen that each piezoelectric actuator includes an element such as an end or metallic projection indicated at 40a, 42a and 44a which engage the planar, corresponding undersurface of Y-axis plate 24. Upon suitable actuation by the controller, the projections, by virtue of the piezoelectric effect, will move simultaneously thereby to rectilinearly translate the Z-axis plate, upwardly or downwardly, along the Z-axis and correspondingly the slide insert and slide 33, when the unit is assembled.

Figure 5:
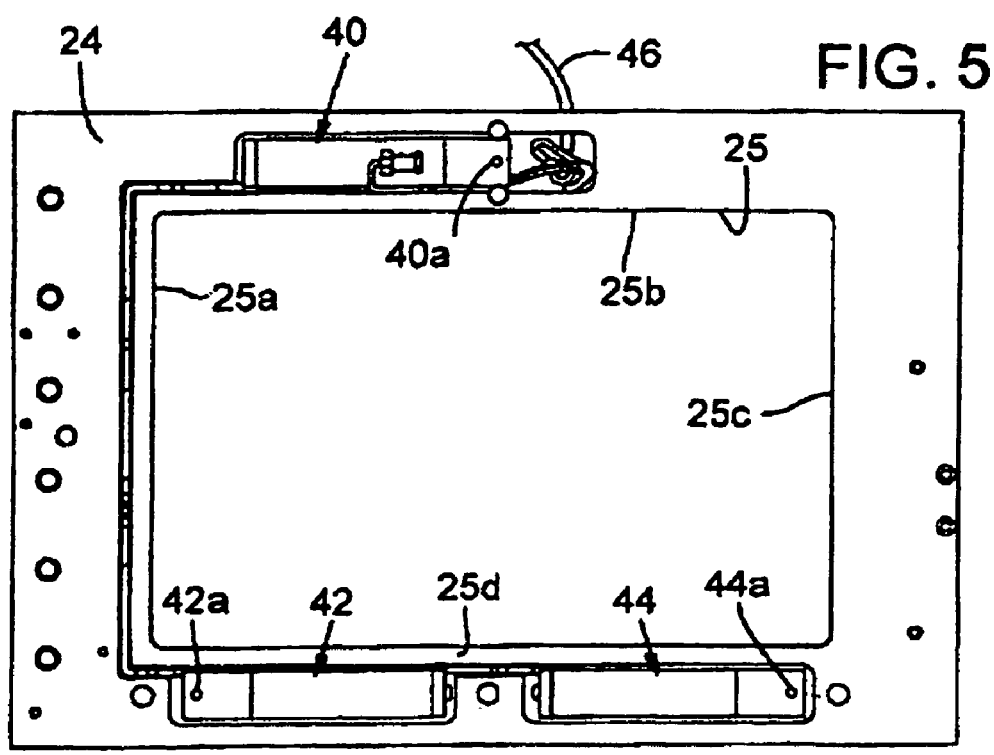
FIG. 5 is a view of the top surface of the Y-axis stage plate showing positioning of the piezoelectric actuators.

As shown in FIG. 5, a cable indicated at 46 is suitably connected to the piezoelectric actuators, and other connections are hidden. The piezoelectric actuators are mounted so that their projections 40a, 42a, 44a are positioned on the same plane ensuring that precise and uniform rectilinear translation, along the same common plane, will be provided during a focusing step.

Figure 6:
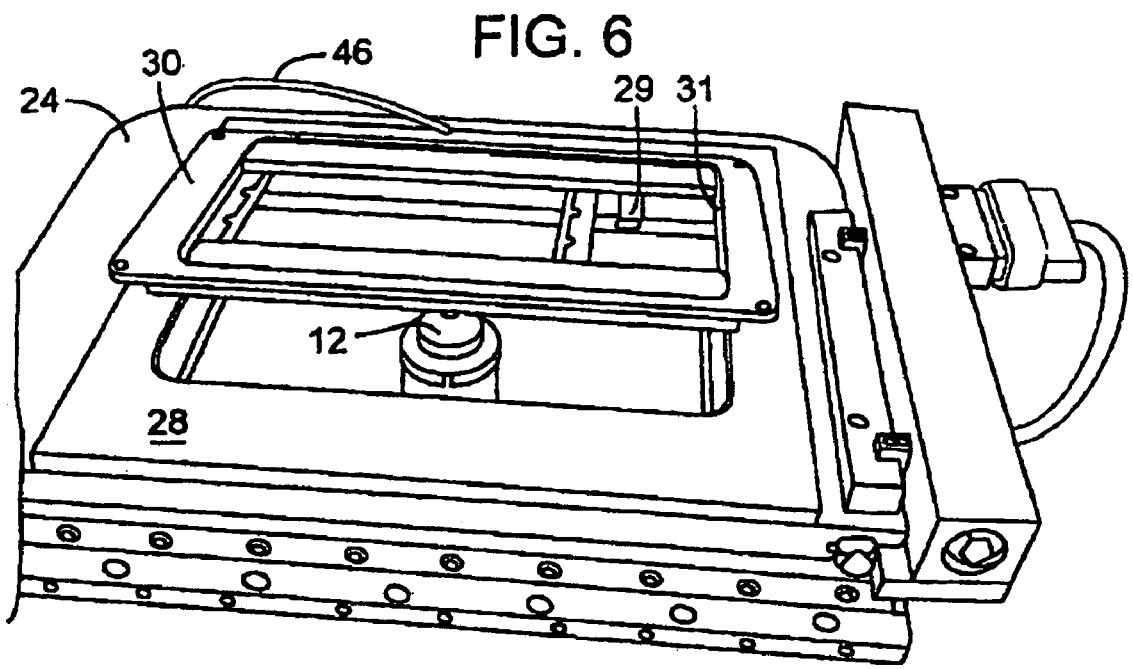
FIG. 6 is a view, taken in perspective, showing the stage insert being directed toward the Z-axis stage plate prior to the slide being mounted on the slide insert.

It will also be noted in FIG. 5 that receiving ledges, such as indicated at 25a–d are provided on Y-axis plate 24 for receiving depending portions on the underside of Z-axis plate 28. FIG. 6 shows the fully inserted Z-axis plate into position in the Y-axis plate.

Figure 7:
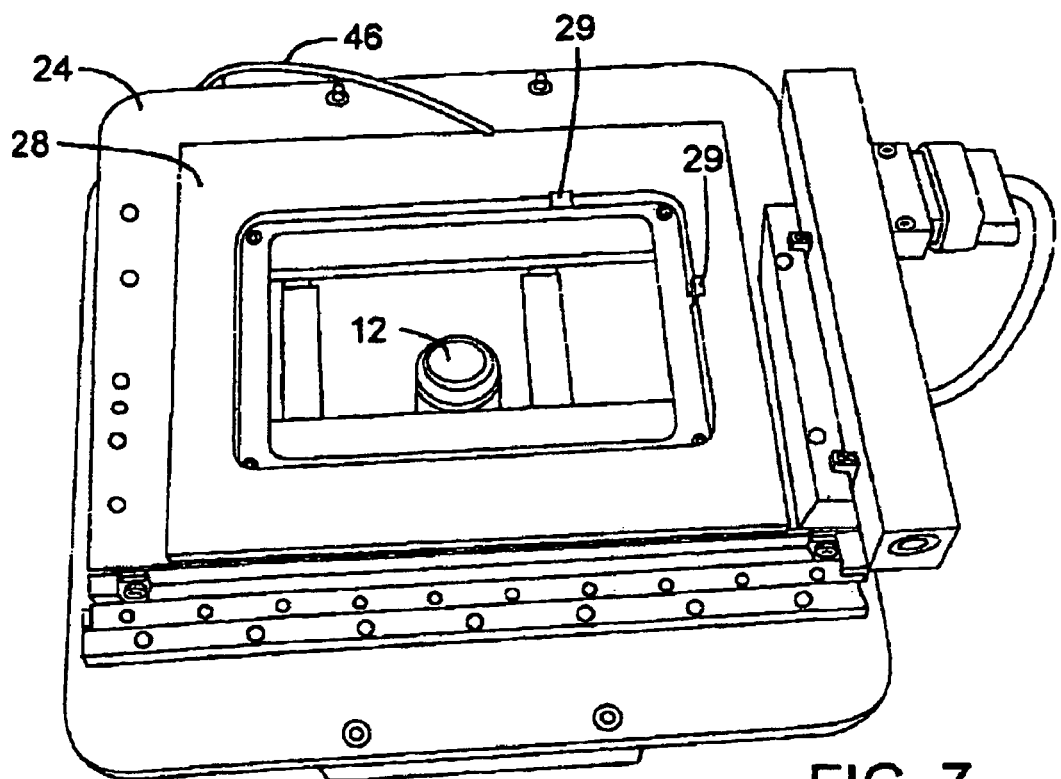
FIG. 7 is a view, taken in perspective, of the Z-axis stage plate mounted in position on the Y-axis stage plate.

FIG. 7 shows stage insert 30 being directed downwardly toward Z-axis plate 28, and will be maintained in the position by retaining clips 29. With stage insert 30 in position, prior to receiving a sample slide or other holder 33, the entire stage assembly is open so that the slide or holder 33 may be viewed by objective lens 12. In the preferred embodiment the footprint for stage insert 30 may be an industry standard so that third party sample incubators and sample preparation formats are supported.

Operation of the XY and Z-Axis Plates

The construction of the XY assembly and the Z-axis plate and its method of use enable precise and accurate positioning of a sample for analysis during investigation with an optical microscope. Information obtained from the optical microscope may be stored in a computer, and by suitably actuating the controller, in a closed loop system, the piezoelectric actuators may be operated to provide fine positioning of the Z-axis plate and the specimen. This type of operation may be very important where it is desired to take readings through horizontal sections of a sample, in fine movements of the sample in the Z-axis direction; for example, it may be desired to store XY coordinates, and take measurements in the Z-axis sequentially over small dimensions with precision of less than 0.05 micrometers.

Because the Z-axis plate is accurately rectilinearly translated, precise readings of the sample are ensured. Moreover, because the Z-axis plate holds the stage insert, the specimen or sample mounted thereon can be positioned close to the designed focal position of the microscope stand. The entire stage assembly consisting of the X, Y and Z stages, can be accurately dimensioned to locate the stage insert and sample proximal to the designed focal position of the microscope stand. The rectilinear translation of the Z-axis plate is accomplished by the simultaneous movement of the piezoelectric actuators which define a common plane, thus enabling the Z-axis plate to be moved with precision as desired.

The X and Y-axis plates are mounted for translation over greater distances compared to Z-axis plate 28, for example, in the range of 100–400 micrometers.

The method of the present invention generally follows the following steps. With the XY assembly mounted in position, and the Z-axis plate oriented as described, a suitable stage insert is mounted in place and the sample or specimen is appropriately positioned on the stage insert. The X-axis and Y-axis plates are suitably rectilinearly translated (by motors or manually, depending on the system) until the microscope operator has the sample's image in rough focus. Then, the piezoelectric actuators are then operated to rectilinearly translate the Z-axis plate either upwardly or downwardly until the desired image can be seen. The actuators can be further operated, to shift the specimen along the Z-axis to obtain different sectional views of whatever the operator wishes to achieve. Use of the Z-axis plate construction, with the piezoelectric actuators enables optical sections to be created, and a series of pictures at the same XY coordinates at different Z positions can be stored in the computer. This is a very different process than moving the objective lens with piezoelectrics.

We claim is:

1. For use with an optical microscope, a stage assembly mountable on an optical microscope for orienting a sample into a desired focal position comprising:
   an X-axis plate operable for rectilinear sliding in the X-axis direction;
   a Y-axis plate mounted on the X-axis plate operable for rectilinear sliding in the Y-axis direction, the X-axis plate and the Y-axis plate defining an XY plate assembly;
   a Z-axis plate mounted on the XY plate assembly configured to carry a sample to be investigated; and
   a piezoelectric actuator mechanism interposed between the XY plate assembly and the Z-axis plate operable for rectilinear translation of the Z-axis plate, wherein the X-axis, Y-axis, and Z-axis plates each includes an internal opening configured to allow passage of transmitted light and viewing of the sample by an objective lens of the optical microscope.

2. The stage assembly of claim 1 wherein the piezoelectric actuator mechanism includes three spaced-apart piezoelectric actuators for engaging the Z-axis plate.

3. The stage assembly of claim 2 wherein the piezoelectric actuators are mounted on the Y-axis plate and engage the Z-axis plate.

4. The stage assembly of claim 3 wherein the three spaced-apart piezoelectric actuators are operable to rectilinearly translate the Z-axis plate along the Z-axis direction in increments of less than 0.05 micrometers.

5. The stage assembly of claim 1 wherein the X-axis plate, Y-axis plate and Z-axis plate are arranged to locate the sample in proximity to the design focal position of the microscope.

6. The stage assembly of claim 1 wherein the Z-axis plate is mounted on the XY plate assembly for travel therewith.

7. A method for use with an optical microscope to facilitate focusing of an image comprising the steps of:
  providing an XY plate assembly including an X-axis plate rectilinearly slidable in the X-axis direction and a Y-axis plate mounted thereon rectilinearly slidable in the Y-axis direction;
  positioning a Z-axis plate on the XY assembly and mounting a sample on the plate, wherein the X-axis, Y-axis, and Z-axis plates each includes an internal opening configured to allow passage of transmitted light and viewing of the sample by an objective lens of the optical microscope; and
  rectilinearly translating the Z-axis plate along the Z-axis for bringing the sample into focus.

8. The method of claim 7 wherein the rectilinear translation of the Z-axis plate includes the step of engaging the Z-axis plate with a piezoelectric mechanism.

9. The method of claim 8 wherein the step of engaging the Z-axis plate is accomplished by piezoelectric actuators interposed between the XY plate assembly and the Z-axis plate.

10. The method of claim 7 wherein the step of mounting the sample includes mounting a slide insert on the Z-axis plate with the sample held thereby.

11. A stage assembly for positioning a sample into a desired focal position for viewing with an optical microscope comprising:
  an XY plate assembly including an X-axis plate configured to slide in the X-axis direction and a Y-axis plate mounted on the X-axis plate configured to slide in the Y-axis direction;
  a Z-axis plate mounted on the XY plate assembly;
  a stage insert configured to selectively mount on the Z-axis plate and support the sample;
  a piezoelectric actuator mechanism interposed between the XY plate assembly and the Z-axis plate configured to translate the Z-axis plate in the Z-axis direction, wherein the X-axis, Y-axis, and Z-axis plates each include an internal opening for viewing the sample on the stage insert with the optical microscope.

12. The stage assembly of claim 11, wherein the stage insert is dimensioned to position the sample proximal to the designed focal position of the optical microscope when mounted on the Z-axis plate.

13. The stage assembly of claim 11, wherein the piezoelectric actuator mechanism includes spaced-apart piezoelectric actuators for engaging the Z-axis plate.

14. The stage assembly of claim 13, wherein the spaced-apart piezoelectric actuators are mounted on the Y-axis plate and engage the Z-axis plate.

15. The stage assembly of claim 14, wherein the spaced-apart piezoelectric actuators are operable to rectilinearly translate the Z-axis plate along the Z-axis direction in increments of less than 0.05 micrometers.

16. The stage assembly of claim 11 wherein the Z-axis plate is mounted on the XY plate assembly for travel therewith.

* * * * *